United States Patent Office 3,667,930
Patented June 6, 1972

3,667,930
3-AMINO-5-HALOGENATEDARYLOXYMETHYL-1,2,4-OXADIAZOLES
Herman Breuer, Regensburg, Germany, assignor to Olin Mathieson Chemical Corporation
No Drawing. Application Oct. 9, 1967, Ser. No. 673,977, now Patent No. 3,564,606, dated Feb. 16, 1971, which is a continuation-in-part of application Ser. No. 566,480, July 20, 1966. Divided and this application Dec. 24, 1969, Ser. No. 888,206
Int. Cl. A01n 9/22
U.S. Cl. 71—92    6 Claims

ABSTRACT OF THE DISCLOSURE

A series of 3-amino-5-halogenatedaryloxymethyl-1,2,4-oxadiazoles are provided by the reaction of selected acyl carbodiimides with hydroxylamine or salts thereof to provide an intermediate N-acylsubstituted-N'-hydroxyguanidine which is converted to the substituted-1,2,4-oxadiazoles by treatment with base. The substituted-1,2,4-oxadiazoles are useful agricultural chemicals, and it has been found that they are particularly outstanding selective herbicides.

---

This application is a division of my copending application Ser. No. 673,977, filed Oct. 9, 1967, and now Pat. No. 3,564,606 which was a continuation-in-part of my copending application Ser. No. 566,480, filed July 20, 1966, and now abandoned.

This invention relates to the preparation of selected substituted-1,2,4-oxadiazoles having the formula

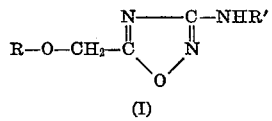

(I)

wherein R represents a halogenated aryl moiety, and R' represents hydrogen, alkyl, aryl, or aralkyl.

3-amino-5-substituted-1,2,4-oxadiazoles having an alkyl or aryl substituent in the 5-position have previously been prepared and described in the literature as, for example, in J. Am. Chem. Soc. 64 (1942), page 2904 and in J. Org. Chem. 18 (1953), page 934. However, preparation of the compounds I having a haloaryloxymethyl group substituted in the 5-position has not been heretofore accomplished. In accordance with this invention, the compounds I have now been provided, and it has been found that they are valuable agricultural chemicals being particularly effective as herbicides.

The preparation of the substituted-1,2,4-oxadiazoles I is accomplished in accordance with this invention by the reaction of selected acyl carbodiimides with hydroxylamine or a salt thereof to first provide an N-acylsubstituted-N'-hydroxyguanidine product followed by cyclization of this product by treatment with basic materials under selected conditions. The following equation serves to illustrate the reactions involved in the substituted-1,2,4-oxadiazole preparation (wherein R and R' are as previously represented).

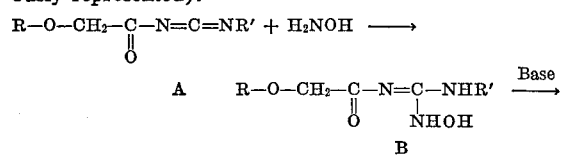

The acyl carbodiimide reactants A wherein R' represents alkyl, aryl, or aralkyl are readily available by treating acyl thioureas with phosgene in the presence of tertiary amines as, for instance, reported in Archiv. der Pharmazie, Band 299, August 1966, page 709; and preferred embodiments of this invention include the use of reactants of this nature wherein R' represents a lower alkyl (e.g., 1–4 carbon atoms) group, phenyl or benzyl.

It is known that the acyl carbodiimide reactants A wherein R' represents hydrogen exist in a tautomeric relationship with acyl cyanamides. In this regard, attention is directed, for instance, to Houben-Weyl's treatise entitled "Methoden der Organischen Chemie," Vierte Auflage, 1952, Band VIII, page 94 for a discussion of such tautomerism. Thus, for instance, halogenated aryloxyacetyl cyanamides of the formula

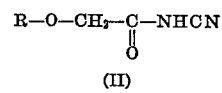

(II)

exist as tautomers of the acyl carbodiimides having the formula

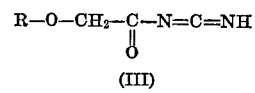

(III)

In accordance with this known tautomeric relationship, it has been found that halogenated aryloxyacetyl cyanamides of the Formula II are useful as reactants in the practice of this invention. They apparently react with hydroxylamine or a salt thereof in the form of the tautomeric acyl carbodiimides III in accordance with the process outlined herein to provide the compounds I of this invention wherein R' represents hydrogen. As used therefore in the specification herein, it is understood that the term "acyl carbodiimide" used in defining suitable reactants includes halogenated aryloxyacetyl cyanamides of the Formula II.

The compounds II are readily provided by the reaction of cyanamide or a salt thereof with halogenated aryloxyacetyl chlorides preferably in the presence of suitable bases which facilitate the reaction by acting as acid acceptors and increasing desirable solubility characteristics. The preparation of halogenated aryloxyacetal cyanamides of this type has been described in detail in my U.S. 3,564,607, entitled "Halogenated Aryloxyacetyl Cyanamides," filed concurrently herewith, and the complete disclosure of that U.S. patent is specifically incorporated by reference herein.

Particularly useful halogenated aryloxyacetyl cyanamides II (acyl carbodiimides) to be used in the practice of this invention are those wherein R represents a halogenated aryl group having from 6–10 carbon atoms and not containing any unsaturation other than of the benzenoid type. Thus, R may represent a phenyl, tolyl, xylyl, naphthyl or like group substituted with one or more halogen atoms directly attached to the said aryl ring. Illustrative of such starting materials are o-chlorophenoxyacetylcyanamide,
o-bromophenoxyacetylcyanamide,
o-fluorophenoxyacetylcyanamide,
o-iodophenoxyacetylcyanamide,
p-chlorophenoxyacetylcyanamide,
p-bromophenoxyacetylcyanamide,
p-fluorophenoxyacetylcyanamide,
p-iodophenoxyacetylcyanamide,
2,4-dichlorophenoxyacetylcyanamide,
2,4-dibromophenoxyacetylcyanamide,
2,4-difluorophenoxyacetylcyanamide,
2,4-diiodophenoxyacetylcyanamide,
3,4-dichlorophenoxyacetylcyanamide,
3,4-dibromophenoxyacetylcyanamide,
3,4-difluorophenoxyacetylcyanamide,
3,4-diiodophenoxyacetylcyanamide,
2,4,5-trichlorophenoxyacetylcyanamide,
2,4,5-tribromophenoxyacetylcyanamide, 2,4,5-trifluorophenoxyacetylcyanamide,
2,4,5-triiodophenoxyacetylcyanamide,
2-methyl-4-chlorophenoxyacetylcyanamide,
2-methyl-4-bromophenoxyacetylcyanamide,
2-methyl-4-fluorophenoxyacetylcyanamide, and
2-methyl-4-iodophenoxyacetylcyanamide.

Other suitable halogenated aryloxyacetylcyanamides II (acyl carbodiimides) which may be used as starting materials in the preparation of the compounds I are disclosed in my aforementioned copending U.S. patent application. While the aryl moieties included in R may be substituted by one or more of any of the halogens (e.g., fluorine, chlorine, bromine, iodine), prefered embodiments of this invention include those compounds I where R represents chlorinated aryl and especially chlorinated phenyl.

Hydroxylamine itself may be used as a reactant in the preparation of the substituted-1,2,4-oxadiazoles I, but preferred practice involves the use of a mineral acid salt of hydroxylamine such as the sulfate or nitrate. A particularly effective reactant, and thus a most preferred reactant is hydroxylamine hydrochloride.

As mentioned in the preceding discussion, formation of the substituted-1,2,4-oxadiazoles proceeds through the intermediate N-acyl-substituted-N'-hydroxyguanidines (or their mineral acid addition salts if a mineral acid salt of hydroxylamine is used in the process). These intermediate products may be isolated prior to being converted to the -1,2,4-oxadiazole products, but the more convenient practice is to form the desired derivatives I without undertaking a separation step for the intermediate substituted hydroxyguanidines.

Various solvents are advantageously employed in the first stage of the process which involves formation of the substituted hydroxyguanidine intermediates. For instance, the lower alkanols such as methanol, ethanol and the like are suitably utilized in this process step as well as other solvents such as dioxane.

Reaction of the carbodiimides with the hydroxylamine salts appears to be promoted by the presence of small amounts of organic bases. In this respect, it has been found that heterocyclic bases such as pyridine or quinoline in amounts of at least 0.2 mole/mole of carbodiimide reactant are usefully employed.

Cyclization of the substituted hydroxyguanidines is caused essentially by treatment of these intermediates with aqueous inorganic bases particularly the alkali metal and alkaline earth metal hydroxides. Treatment with aqueous bases of this nature even at room temperature provides the substituted-1,2,4-oxadiazoles, but cyclization occurs most rapidly and completely when the intermediates are stirred with aqueous alkali at an elevated temperature range of from about 35° C. to about 100° C. The desired products I are soluble in the resulting strong basic aqueous reaction mixtures, and then are conveniently isolated by crystallization procedures from these basic media.

Formation of and isolation of the intermediate substituted guanidines is best performed at a reaction temperatures of about −10° C. to 30° C., and as mentioned before, these intermediates may be isolated by crystallization procedures from the initial reaction mixture if desired. Thereafter, they are readily converted to the corresponding substituted-1,2,4-oxaliazoles by merely adding them to aqueous alkali. For instance, pure N-p-chlorophenoxyacetyl-N'-hydroxyguanidine hydrochloride is converted to 3-amino-5-(p-chlorophenoxymethyl)-1,2,4-oxadiazole in 96% yield by suspending the intermediate in water, adding 30% sodium hydroxide until alkaline and stirring at room temperature for 12 hours.

Generally, however, since preferred practice does not involve isolation of the intermediate, the reaction mixture containing the substituted hydroxyguanidines may be admixed with aqueous alkali at an elevated temperature with stirring to provide the products I directly. This procedure is illustrated in the examples hereinafter.

The following examples serve to illustrate the preparation of the 3-amino-5-halogenatedaryloxymethyl-1,2,4-oxadiazoles of this invention. However, it is understood that these examples are not to be considered as limiting the scope of this invention in any manner nad are furnished merely for the purpose of illustration.

EXAMPLE 1

Almost complete solution occurred at room temperature when 55.6 g. (0.80 mole) of hydroxylamine hydrochloride was stirred with a mixture of 135 g. of pyridine and 200 ml. of absolute alcohol. Addition of 84.2 g. (0.40 mole) of o-chlorophenoxyacetyl cyanamide at 27° C. gave complete solution. The temperature slowly rose and gas was evolved. At 40° C. gas evolution increased and the solution was placed in a freezer. The next morning the solution was heated to 60° C. causing more gassing. The solution was then poured into cold, dilute potassium hydroxide. Solid separated after standing 2 hours in a refrigerator; the nearly colorless solid was filtered, washed with water, and air dried. The product weighed 22.8 g. (25.2% yield); M.P. 108–111° C. Recrystallization from 85/15 carbon tetrachloride/chloroform- with charcoal treatment, gave 18.8 g. of material; M.P. 110°–111° C. The following analytical data revealed that 3-amino-5-(o-chlorophenoxymethyl)-1,2,4-oxadiazole had been obtained.

*Analysis.*—Calcd. for $C_9H_8ClN_3O_2$ (percent): C, 47.89; H, 3.54; Cl, 15.7; N, 18.62. Found (percent): C, 48.00; H, 3.38; Cl, 15.5; N, 18.70.

EXAMPLE 2

15.4 g. (0.22 mole) of hydroxylamine hydrochloride was powdered and suspended in a mixture of 100 mls. of absolute alcohol and 8.0 g. of pyridine. Then, 42.2 g. (0.20 mole) of p-chlorophenoxyacetyl cyanamide was added at once to the suspension. The temperature fell from 24° C. to 18° C. at once, and then the temperature gradually rose over a one-half hour period to 30° C. while the mixture was being stirred. The reaction mixture gradually became clear and the mixture was stirred while the temperature was maintained below 30° C. by external cooling means. After the reaction mixture stood overnight at room temperature, a volume of water and 2 normal sodium hydroxide solution was added until the reaction mixture became strongly alkaline (pH of about 12). The reaction mixture was stirred for 2 hours and filtered to remove solid material which was washed with water and dried at 50° C. There was thus obtained 29 g. of a white crystalline material melting at 151–152° C. Elemental analysis confirmed that 3-amino-5-(p-chlorophenoxymethyl)-1,2,3-oxadiazole had been obtained. Yield 61.2%.

EXAMPLE 3

A solution of 29.1 g. (0.42 mole) of hydroxylamine hydrochloride in a mixture of 75 g. of pyridine and 125 ml. of absolute alcohol was cooled to 30° C., and 52.0 g. (0.21 mole) of 2,4-dichlorophenoxyacetyl cyanamide added in one quantity. Complete solution occurred and the temperature rose to 43° C. After the temperature fell to 30° C., the solution was placed in a freezer until the next day. The solution was then poured into dilute potassium hydroxide solution and the mixture, which continued solid, was stored in a refrigertor for 3 hours. The solid was filtered, washed with water, and allowed to dry. The product weighed 16.3 g., M.P. 122–125° C. Purification from chloroform, with charcoal treatment, gave 12.5 g. of colorless crystals melting at 126–127° C. The following analytical data revealed that 3-amino-5-(2', 4'-dichlorophenoxymethyl)-1,2,4-oxadiazole had been obtained. Yield 31.3%.

*Analysis.*—Calcd. for $C_9H_7Cl_2N_3O_2$ (percent): C, 41.53; H, 2.69; Cl, 27.30; N, 16.15. Found (percent): C, 41.79; H, 2.78; Cl, 27.05; N, 16.22.

EXAMPLE 4

Almost complete solution occurred when 55.6 g. (0.80 mole) of hydroxylamine hydrochloride was stirred with 135 g. of pyridine and 200 ml. of absolute alcohol. Addition of 111.8 g. (0.40 mole) of 2,4,5-trichlorophenoxyacetylcyanamide gave complete solution. The temperature slowly rose from 27° to 38° C. A slight amount of gassing occurred. After 3 hours, the solution was placed in a refrigerator overnight. The viscous solution was then poured into cold, dilute potassium hydroxide solution, causing formation of a precipitate. The mixture was filtered after storage for one hour in a refrigerator. The colorless solid weighed 30.2 g. (25.6%) and melted at 199°–204° C., with softening below this temperature. Recrystallization, with charcoal treatment, from chloroform gave 15.5 g. of colorless product. The compound now melted at 153°–154° C. The following analytical data revealed that 3-amino-5-(2′,4′,5′-trichlorophenoxymethyl)-1,2,4-oxadiazole had been obtained.

*Analysis.*—Calcd. for $C_9H_6Cl_3N_3O_2$ (percent): C, 36.67; H, 2.03; Cl, 36.16; N, 14.26. Found (percent): C, 36.83; H, 2.16; Cl, 36.30; N, 14.25.

EXAMPLE 5

Almost complete solution occurred at room temperature on stirring 55.6 g. (0.80 mole) of hydroxylamine hydrochloride with a mixture of 15.0 g. of pyridine and 200 ml. of absolute alcohol. Addition of 89.8 g. (0.40 mole) of 2-methyl-4-chlorophenoxyacetylcyanamide at 27° C. gave complete solution. The temperature slowly rose to 45° C. and then fell. Some gas was evolved. After reaching room temperature the solution was placed in a refrigerator overnight. The solution was then poured into cold, dilute potassium hydroxide solution, giving a precipitate.

The mixture was placed in a refrigerator an hour, the solid filtered, washed with water, and allowed to dry. The product weighed 19.4 g. (20.2% yield); M.P. 96°–100° C. Recrystallization from chloroform, with charcoal treatment, gave 13.6 g. of colorless crystals; M.P. 101°–102° C. The analytical sample was dried in an Abderhalden pistol to remove traces of chloroform. The following analytical data revealed that 3-amino-5-(4-chloro-o-tolyloxymethyl)-1,2,4-oxadiazole had been obtained.

*Analysis.*—Calcd. for $C_{10}H_{10}ClN_3O_2$ (percent): C, 50.10; H, 4.17; Cl, 14.82; N, 17.53. Found (percent): C, 50.18; H, 4.16; Cl, 14.93; N, 17.62.

The 3-amino-5-halogenatedaryloxyacetyl-1,2,4-oxadiazoles of this invention have been found to be useful agricultural chemicals. They are useful herbicides against a variety of grassy and broad-leaf weeds when utilized in both pre-emergence and post-emergence treatment. Further evaluation has revealed that the compounds I are useful aquatic herbicides, since they effectively inhibit the growth of mixed algae and duckweed.

The utility of the substituted-1,2,4-oxadiazoles as herbicides has been clearly demonstrated. Thus, a primary screening evaluation revealed that the compounds I at a dosage level of 10 lbs./acre (in pre- and post-emergence treatment) nearly completely inhibited the growth of a mixture of weeds including rye grass, crab grass, pigweed, and mustard representing common species of unwanted vegetation of both grassy and broad-leaf type.

Further and more advanced testing has confirmed the effectiveness of the compounds I as herbicides, and in addition it has also been found that members of the series I wherein R represents chlorinated phenyl and R′ represents hydrogen are particularly useful as selective corn herbicides. This has been demonstrated by the following test wherein, for instance, 3-amino-5-(p-chlorophenoxymethyl)-1,2,4-oxadiazole was evaluated. Greenhouse flats were planted with seeds of different plants including weed and crop species for evaluation of the phytotoxic effects of selected herbicides, and the following procedure was utilized in this evaluation. First the soil in the flats was seeded with crop seeds, and these seeds were covered with a layer of soil. Next weed seeds were planted on designated parts of the soil, and these seeds were covered with another layer of soil. The flats were then sprayed with acetone-water solutions of 3-amino-5-(p-chlorophenoxymethyl)-1,2,4-oxadiazole prior to placing the flats in growing rooms maintained at constant conditions of temperature, humidity and lighting to encourage optimum plant growing. After a period of 2½ weeks, the flats were examined in order to determine the effects of the herbicidal agent on the varied weed and crop species which had been planted.

In the following table wherein the results of this test are tabulated, the plant and weed species are represented by the following letters:

(A) crab grass
(B) pigweed
(C) mustard
(D) Johnson grass
(E) barnyard grass
(F) foxtail
(G) corn The relative value of the active ingredient with respect to its herbicidal effect on the various plants is indicated by a number as follows:

0—no phytotoxicity
1–4—slight phytotoxicity
5–7—moderate phytotoxicity
8–10—severe phytotoxicity

TABLE I

| Lbs. per acre | A | B | C | D | E | F | G |
|---|---|---|---|---|---|---|---|
| 10 | 10 | 10 | 10 | 10 | 9 | 9 | 3 |
| 5 | 10 | 10 | 10 | 10 | 9 | 9 | 1 |
| 1 | 3 | 8 | 8 | 5 | 0 | 5 | 0 |

The data in the above table clearly demonstrates the unusual activity of a member of the series I as a pre-emergence herbicide against a variety of weed species while not substantially inhibiting corn growth. This result was further verified by a randomized complete block field test in a known corn producing area using 3-amino-5-(p-chlorophenoxymethyl)-1,2,4-oxadiazole as the active herbicidal ingredient. This specialized field test was accomplished in the following manner. A test field was divided into sixteen plots with suitable buffer zones between each plot. 3-amino-5-(p-chlorophenoxymethyl)-1,2,4-oxadiazole was applied to four plots at a rate of 10 lbs./acre, to four plots at a rate of 5 lbs./acre, and to four plots at a rate of 1 lb./acre, while no active herbicidal ingredient was utilized in the remaining four plots. Plot assignments were given randomly. A known amount of corn was planted in each of the sixteen plots, and seven weed species (rye grass, crab grass, pigweed, mustard, Johnson grass, barnyard grass, and foxtail) were seeded randomly over the sixteen plots. After a six-week growing period, examination of the test plots was carefully made with respect to (a) corn wet weights of one half the corn in each plot without altering row spacing, (b) weed count in two square feet of each plot selected randomly, and (c) an evaluation of the weed and plant conditions in each plot.

With respect to corn wet weight, there was no significant difference between the wet weight of the corn in the control plots and the wet weight of the corn in the plots treated with the 3-amino-5-(p-chlorophenoxymethyl)-1,2,4-oxadiazole at 5 lbs./acre.

Weed control in the treated plots was excellent. An average of 86% of the weeds were controlled in the plots having an active ingredient concentration of 10 lbs./acre; and likewise at 5 lbs./acre there was an 85% weed control. At 1 lb./acre there was still a 35% weed control.

With respect to general weed and plant conditions, it was found that the active ingredient did not exert any phytotoxic effect at all on the corn at a rate of 1 or 5 lbs./acre. There was a very minor phytotoxic effect on the corn in the plots wherein the active ingredient had been applied at a rate of 10 lbs./acre.

The agricultural method of this invention thus comprises applying a herbicidal amount of the substituted compounds I to the locus to be protected from undesirable weed growth; for example, it is applied directly to weeds in post-emergence treatment and to soil areas in pre-emergence treatment.

Although the herbicides I may be directly administered to the area where control of weed growth is desired, they are preferably admixed with carriers and diluents which are commonly referred to as pest control adjuvants. Thus, a wide variety of such adjuvants may be utilized with the herbicides of this invention to provide herbicidal formulations conveniently adapted for application using conventional applicator equipment. In this respect, both solid and liquid herbicidal formulations containing a member of the series I as the essential active ingredient are provided in accordance with this invention.

For example, dust compositions are readily provided by mixing the active substituted-1,2,4-oxadiazoles I with various free-flowing solid carriers and grinding the resulting mixture to obtain a dust having an average particle size of about 20–50 microns. Concentration by weight of the active ingredient in these dusts is generally in the range of about 5–20% although larger concentrations may be utilized if desired. Among the solid carriers which may be employed in such formulations are natural clays such as attapulgite and kaolinite clays, diatomaceous earth, finely divided talcs and synthetic mineral fillers derived from silica and silicate such as synthetic fine silica and synthetic calcium and magnesium silicates. Other suitable carriers include magnesium and calcium carbonates.

The compounds I may be advantageously formulated with other carriers to provide wettable powders. These powders are conveniently prepared by mixing the active ingredient with solid carriers of the aforementioned type and adding to the mixture a surface-active agent in amount sufficient to impart water dispersibility to the powdered compositions. Aqueous dispersions of such wettable powders are particularly adapted for spraying and sprinkling operations on areas which are to be protected from weed growth.

Numerous surface-active agents are available and suitable for use in such wettable powders. These agents may be referred to as wetting or dispersing agents, and they may be of the nonionic, cationic or anionic type. Mixtures of such agents are conveniently employed in these formulations in a manner well known to those skilled in this art. For example, among those surface-active agents commonly employed in these compositions are alkyl aryl sulfonates such as sodium decyl benzene sulfonate, fatty alcohol sulfates such as sodium dodecyl sulfate, alkali metal oleates, sodium lignosulfonate and the like. A comprehensive listing of many other surface-active agents suitable for use in the formulation of typical agricultural dispersions, suspensions, etc., has been prepared and disclosed by McCutcheon in "Soap and Chemical Specialties," 31, Nos. 7–10 (1955).

Wettable powders of the above type usually contain about 0.1–10.0% by weight of the aforementioned surface-active agents with the preferred concentration naturally being dependent upon the nature of the system in which the agent is used and the particular type of application technique being employed. Wettable powders containing about 2–5% of these surface-active agents are generally prepared. For instance, a typical formulation which has been found to be quite suitable is a wettable powder comprising 65% by weight of 3 - amino-5-(p-chlorophenoxymethyl)-1,2,4-oxadiazole, 30% by weight of Barden clay, 2% by weight of an oxyalkylated nonylphenol having a molecular weight of about 200 and 3% by weight of a lignosulfonate dispersing agent.

Other solid herbicidal compositions containing the compounds I as active ingredients are provided in accordance with this invention by dissolving the chemical in a volatile solvent (i.e., acetone) and impregnating this solution upon granular solids such as attapulgite clay, ground vegetable shells, walnut shells, and the like. Upon removal of the solvent, potent solid herbicidal formulations are obtained. A typical granular formulation of this contains 10–20% by weight of the herbicidal ingredient.

Similarly, suspension-type formulations may be conveniently prepared having the substituted - 1,2,4-oxadiazoles I as the active ingredients. For instance, an acetone solution of 3 - amino-5-(p-chlorophenoxymethyl)-1,2,4-oxadiazole containing one of the above-listed dispersing agents can be added to water to provide suspensions which are especially suitable for spraying operations.

Emulsifiable concentrates containing the active ingredients I are also readily prepared and are suitable in applying the herbicides to the locus to be protected. These formulations are conveniently provided by dissolving the substituted-1,2,4-oxadiazoles in a suitable solvent (e.g., xylene) and adding an appropriate surfactant to the resultant solution which is capable of forming an emulsion upon addition to water. Typically, a xylene solution of the active ingredient contains about 5% by weight of surfactant which advantageously might comprise a mixture of a non-ionic surfactant such as oxyalkylated nonylphenol and an anionic surfactant such as an alkylbenzene sulfonate.

Naturally, in order to control the undesirable weed growth, the active ingredient must be applied to the area or locus to be protected in an amount sufficient to exert the desired herbicidal action. Thus, it may be necessary to apply different amounts of the compounds I to achieve a desired result depending upon the extent and nature of weed growth, application procedures and other varying features. Generally, it has been found that effective herbicidal action can be obtained by applying the active ingredients of this invention at a rate of about 1–10 pounds per acre.

What is claimed is:

1. A method for the destruction and inhibition of weeds which comprises applying to the area to be protected in an amount sufficient to exert a herbicidal action a substituted-1,2,4-oxadiazole of the formula

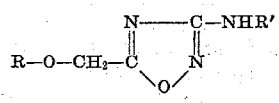

wherein R represents halogenated aryl, said aryl being phenyl, naphthyl or alkylated phenyl having up to 10 carbon atoms, and R' represents hydrogen, lower alkyl, phenyl or benzyl.

2. The method of claim 1 wherein said substituted-1,2,4-oxadiazole is applied to the soil medium as a pre-emergence herbicide.

3. A method for the destruction and inhibition of weeds which comprises applying to the area to be protected in an amount sufficient to exert a herbicidal action a substituted-1,2,4-oxadiazole of the formula

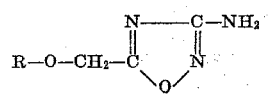

wherein R represents chlorinated aryl, said aryl being phenyl, naphthyl, or alkylated phenyl having up to 10 carbon atoms.

4. The method of claim 3 where R in said substituted-1,2,4-oxadiazole represents chlorinated phenyl.

5. The method of claim 4 wherein said compound is 3-amino-5-(p-chlorophenoxymethyl)-1,2,4-oxadiazole.

6. A method of selectively destroying weeds in a corn crop which comprises applying to the soil medium surrounding said plants 3-amino-5-(p-chlorophenoxymethyl)-1,2,4-oxadiazole at a rate sufficient to destroy said weeds substantially without damaging said corn crop.

References Cited

UNITED STATES PATENTS

| 3,429,688 | 2/1969 | Duerr et al. | 71—90 |
| 3,260,588 | 7/1966 | Schroeder | 71—90 |
| 3,203,959 | 8/1965 | Huffman | 71—92 |

LEWIS GOTTS, Primary Examiner

C. L. MILLS, Assistant Examiner

U.S. Cl. X.R.

71—66, 67